United States Patent
Kaidantsis et al.

(10) Patent No.: US 10,858,023 B2
(45) Date of Patent: Dec. 8, 2020

(54) MATTRESS AIR SUPPLY DEVICE CART AND METHODS OF USE

(71) Applicant: Medline Industries, Inc., Northfield, IL (US)

(72) Inventors: Stephen Kaidantsis, Chicago, IL (US); Drew Phalen, Skokie, IL (US); Vincent Hahn, Chicago, IL (US)

(73) Assignee: Medline Industries, Inc., Northfield, IL (US)

(*) Notice: Subject to any disclaimer, the term of this patent is extended or adjusted under 35 U.S.C. 154(b) by 0 days.

(21) Appl. No.: 16/354,680

(22) Filed: Mar. 15, 2019

(65) Prior Publication Data

US 2020/0290661 A1 Sep. 17, 2020

(51) Int. Cl.
| | |
|---|---|
| *B62B 3/10* | (2006.01) |
| *B62B 3/00* | (2006.01) |
| *B62B 5/04* | (2006.01) |
| *B62B 3/02* | (2006.01) |
| *F16M 11/04* | (2006.01) |
| *A61G 7/057* | (2006.01) |
| *A47G 9/02* | (2006.01) |
| *F16M 11/42* | (2006.01) |
| *A47G 9/00* | (2006.01) |

(52) U.S. Cl.
CPC ............. *B62B 3/10* (2013.01); *A47G 9/0223* (2013.01); *A61G 7/05769* (2013.01); *B62B 3/008* (2013.01); *B62B 3/02* (2013.01); *B62B 5/0433* (2013.01); *F16M 11/046* (2013.01); *F16M 11/42* (2013.01); *A47G 2009/003* (2013.01)

(58) Field of Classification Search
CPC .. B62B 3/02; B62B 3/10; B62B 3/102; B62B 3/104; A61G 7/05769; F16M 11/046; F16M 11/42
See application file for complete search history.

(56) References Cited

U.S. PATENT DOCUMENTS

| | | | | |
|---|---|---|---|---|
| 2,832,630 | A * | 4/1958 | Sterling | B65G 67/00 294/119.2 |
| 2,839,310 | A | 6/1958 | Livingston | |
| 2,893,578 | A * | 7/1959 | Paul | B62B 3/104 414/451 |
| 2,901,261 | A * | 8/1959 | Olvey | B62B 3/10 280/654 |
| 3,052,441 | A * | 9/1962 | Fleischman | B62B 3/104 248/141 |

(Continued)

*Primary Examiner* — Erez Gurari
(74) *Attorney, Agent, or Firm* — Fitch, Even, Tabin & Flannery LLP

(57) ABSTRACT

In some embodiments, apparatuses and methods are presented herein useful to provide a mobile air blower cart for an air supply or blower for use in treating patients, such as those with limited mobility. In one approach, a mobile air blower unit has a mobile air blower cart and an air supply or blower. Further, the blower cart includes a stand with a plurality of legs having casters therewith, a top basket with a center platform and wire sides for holding an air blower disposed on the center platform of the basket, and a retaining hook to retain a hose attached to the air blower. In some approaches, the cart includes a side basket sized for retaining therapy mattresses and a bracket around which the blower cord may be wound when not in use.

11 Claims, 8 Drawing Sheets

(56) References Cited

U.S. PATENT DOCUMENTS

| | | | |
|---|---|---|---|
| 3,191,786 A * | 6/1965 | Langrell | B62B 3/104 |
| | | | 414/444 |
| 3,698,733 A | 10/1972 | Isaacs | |
| 4,521,030 A | 6/1985 | Vance | |
| 5,299,816 A | 4/1994 | Vom Braucke | |
| 5,490,684 A * | 2/1996 | Chapman | B60G 99/00 |
| | | | 280/400 |
| 5,687,984 A | 11/1997 | Samuel | |
| 5,984,406 A | 11/1999 | Lee | |
| 6,009,595 A | 1/2000 | Leasure | |
| 6,082,813 A | 7/2000 | Chen | |
| 6,155,579 A | 12/2000 | Eyman | |
| 6,209,951 B1 | 4/2001 | Han | |
| 6,231,119 B1 | 5/2001 | Zheng | |
| 6,247,748 B1 | 6/2001 | Zheng | |
| 6,247,749 B1 | 6/2001 | Yu | |
| 6,264,271 B1 | 7/2001 | Munn | |
| 6,428,033 B1 | 8/2002 | Harrison | |
| 6,471,236 B1 | 10/2002 | Eskridge | |
| 6,578,858 B1 * | 6/2003 | Haddock | A47L 11/4061 |
| | | | 15/246 |
| 6,715,824 B2 | 4/2004 | Zheng | |
| 6,736,450 B2 | 5/2004 | Miyagi | |
| 6,776,433 B2 | 8/2004 | Harrison | |
| D500,575 S | 1/2005 | Lucas | |
| 6,938,911 B1 | 9/2005 | Shyu | |
| 7,036,161 B2 | 5/2006 | Harrison | |
| 7,188,847 B1 | 3/2007 | Friedman | |
| 7,229,131 B2 | 6/2007 | Chen | |
| D553,325 S | 10/2007 | Miller, Jr. | |
| D557,421 S | 12/2007 | Fleck | |
| D558,948 S | 1/2008 | Miller | |
| 7,434,820 B1 * | 10/2008 | Aliseo | B62B 3/104 |
| | | | 211/85.5 |
| 7,445,216 B1 | 11/2008 | Chou | |
| 7,458,601 B2 | 12/2008 | Miller | |
| 7,472,921 B2 | 1/2009 | Harrison | |
| 7,503,085 B2 | 3/2009 | Harrison | |
| 7,527,284 B2 | 5/2009 | Nores | |
| D603,048 S | 10/2009 | Fleck | |
| D611,610 S | 3/2010 | Fleck | |
| 7,997,593 B2 | 8/2011 | Sergyeyenko | |
| 8,024,825 B2 | 9/2011 | Harrison | |
| D668,829 S | 10/2012 | Ono | |
| 8,393,634 B2 | 3/2013 | Radlow | |
| 8,505,960 B1 | 8/2013 | Shindelar | |
| 8,740,298 B2 | 6/2014 | Kenttamaa-Squires | |
| 8,998,219 B1 | 4/2015 | Sellers | |
| 9,498,402 B2 | 11/2016 | Touhey | |
| 9,561,151 B2 | 2/2017 | Opsetmoen | |
| 9,566,120 B2 | 2/2017 | Malackowski | |
| D844,276 S | 3/2019 | Schlenker | |
| D845,578 S | 4/2019 | Gammons | |
| D854,772 S | 7/2019 | Ecklund | |
| 10,435,055 B1 | 10/2019 | Zhu | |
| D867,709 S | 11/2019 | Coules | |
| 10,479,386 B2 | 11/2019 | Duru | |
| 10,514,126 B2 | 12/2019 | Asante | |
| 10,532,756 B1 | 1/2020 | Rekhviashvili | |
| D879,401 S | 3/2020 | Ecklund | |
| 2004/0222605 A1 * | 11/2004 | Sterns | B62B 3/027 |
| | | | 280/47.34 |
| 2009/0052974 A1 * | 2/2009 | Treacy | A47L 13/22 |
| | | | 401/196 |
| 2013/0106073 A1 * | 5/2013 | Gamard | B62B 3/104 |
| | | | 280/79.2 |
| 2014/0125023 A1 * | 5/2014 | Cook | B62B 5/0083 |
| | | | 280/79.6 |
| 2016/0082998 A1 * | 3/2016 | Eisenhut | A47L 13/51 |
| | | | 280/47.35 |
| 2018/0078090 A1 * | 3/2018 | Boyd, Sr. | A47J 36/12 |
| 2018/0250180 A1 | 9/2018 | Phalen | |
| 2019/0185182 A1 * | 6/2019 | Bei | B64D 47/08 |
| 2019/0304602 A1 | 10/2019 | Moctezuma De La Barrera | |
| 2019/0337547 A1 | 11/2019 | Garrison | |

* cited by examiner

MATTRESS AIR SUPPLY DEVICE CART AND METHODS OF USE

TECHNICAL FIELD

The present disclosure relates generally to mobile air blower units for inflatable devices, devices employed therewith, and methods of operation. More particularly, this application relates to devices or carts for moving air supply devices.

BACKGROUND

Therapy air mattresses are designed to move or hold patients that may not be capable of moving for extended periods of time. To limit or control the distribution of pressure points on the mattress, which can cause bend sores in patients, therapy air mattresses may use air instead of springs. To keep the mattress cool, breathable, and comfortable (among other benefits), therapy mattresses may include holes in the top surface that slowly leak air in a controlled manner. Further, air mattresses may be used to move patients by lowering the friction between the patient and the surface upon which they are resting. In use, such air mattresses may be connected to a steady air supply, such as a pump or blower assembly, to provide air at a steady volumetric flow rate and/or to maintain a generally consistent internal air mattress pressure and a steady emission of air through the holes.

Further, patient transport or transfer mattresses are used to facilitate transferring patients from one location to another, for example, from a hospital bed to a gurney. Some patient transfer mattresses include holes on the bottom surface that release air to form an air cushion between the patient transfer mattress and the surface it rests upon. This cushion reduces the force of friction between the mattress and the resting surface, and thus facilitates movement of a patient from one location to another. To maintain the air cushion and to keep the mattress sufficiently inflated when in use, patient transfer mattresses also are connected to an air supply. After use, patient transfer mattresses can be removed from the air supply and returned to a deflated state until such time that they are to be used again.

Patient transfer mattresses also can be used to move or adjust a patient position. In these instances, to sufficiently supply the air to operate (i.e., inflate) the mattresses, each mattress utilizes an air supply device that is designed to meet the particular pressure and/or flow rate demands of the particular mattress. As such air supply devices are used to move numerous patients throughout the day, the air supply device itself is regularly moved from one location to another. Accordingly, it is of interest to make moving the air supply as easy as possible.

DETAILED DESCRIPTION

Figure 1:
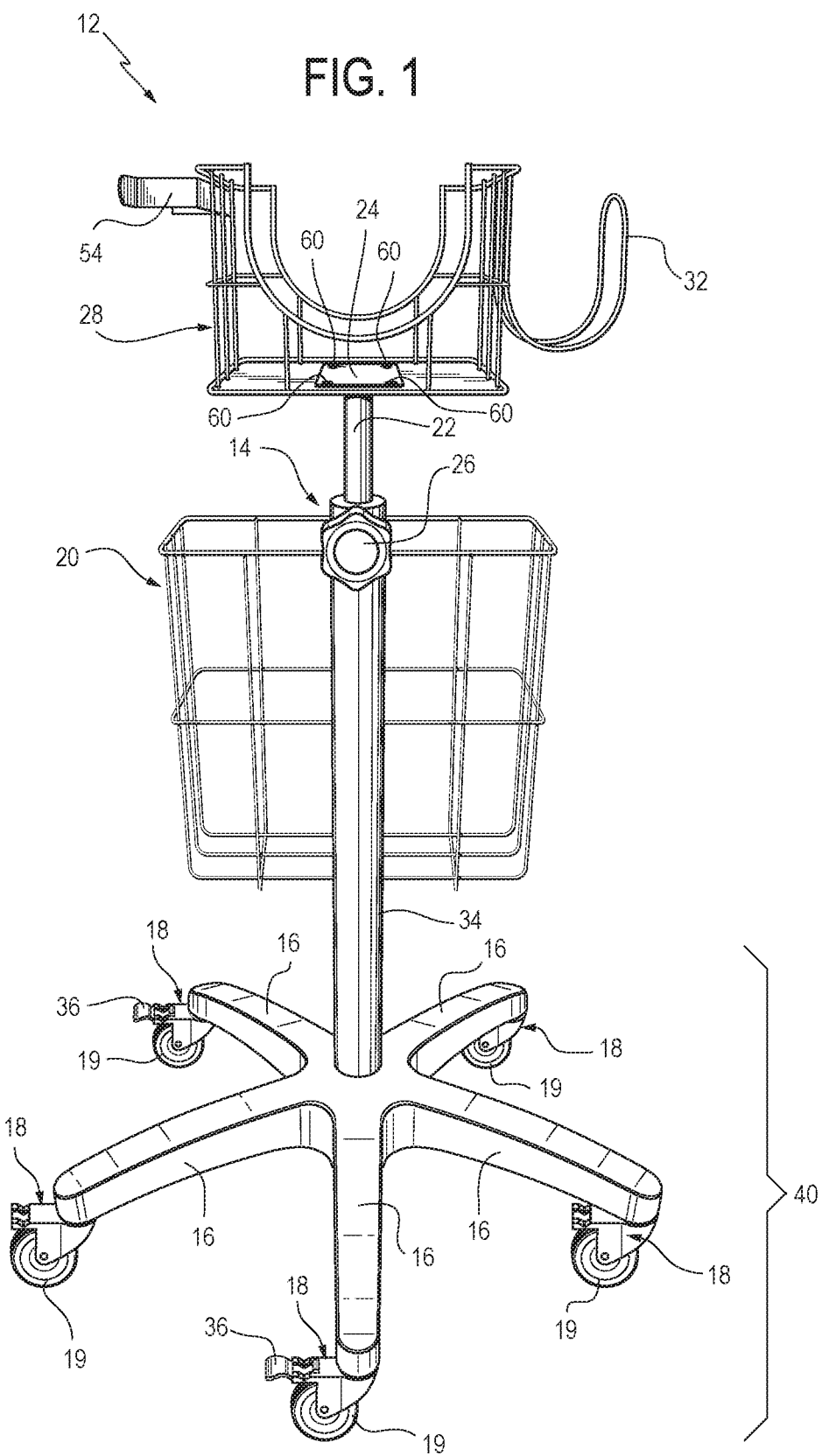
FIG. 1 is a front perspective view showing a mobile air blower cart.

Generally speaking, a mobile air supply kit or blower unit includes a mobile air blower cart and an air supply device or blower. Further, the air blower cart includes, for example, a stand with a plurality of legs having casters thereon, wherein a portion of the casters have locking mechanisms associated therewith, a wire retaining hook with openings for a hose to extend therethrough, a top or center platform, which, in some embodiments, has a basket with wire sides, and an air supply device or blower having a plurality of friction feet to prevent inhibit relative movement of the air blower relative to the top basket when a transverse force is applied to the air supply device by a user manually grasping the handle. In operation, the mobile air supply kit (including the cart and air supply device or blower) permits rolling translation thereof on a floor surface by manual application of a transverse force via said handle. The floor surface upon which the cart moves may include, for example, concrete, tile, or other materials commonly found in hospitals and other healthcare facilities. In some configurations, the stand is weighted such that the legs are heavier than the top (which includes the wire basket with wire sides). To further improve stability, in some embodiments, the legs have an outer diameter of about twenty-inches to about twenty-four inches. The air supply device or blower also may include a handle atop thereof such that the mobile air blower unit can be easily grasped and maneuvered by health care professionals. In some embodiments, the cart includes a side basket usable or sized for retaining therapy or transport mattresses and a bracket upon which the blower cord may be docked or wound for storage.

By one approach, the stand of the blower cart is height adjustable such that the top basket and the air supply device supported therein are movable with respect to a remainder of the unit. Further, the top basket, in some configurations, is self-raising and biased to a first, uppermost position and away from a second lowermost position. Thus, the air supply device is movable over a range of travel between a first, uppermost position and a second, lowermost position and the top basket with the air supply device is biased to the first, uppermost position. By some approaches, the stand includes a pole knob that secures the top basket relative to the base, which can be secured once the healthcare professional personnel has positioned the wire basket and air supply device in the desired position. In operation, a handle atop the air supply device or blower may be disposed at a height ranging from 45-55-inches from a surface upon which the mobile air blower unit is placed. Further, in some configurations, the handle atop the air supply device or blower is disposed between about 42-inches to about 49-inches from the surface upon which the mobile air blower unit is placed.

To provide the desired maneuverability of the unit, the handle of the air supply device can be easily grasped by a user and the forces applied to the handle transferred to a remainder of the unit. To that end, the air supply device or blower, in some configurations, has one or more friction feet, which operate to inhibit or prevent relative movement of the air supply device and the top basket or portions thereof. The air blower may have about four friction feet that engage a base or friction lining of the top basket, which may include, for example, an elastomeric material, such as, rubber, silicon, or plastic. Further, in some embodiments, three of the five casters have locking mechanisms associated therewith. Thus, to secure the mobile unit into position, one or more of the looking mechanisms may be engaged.

In operation, an air supply device or blower may be placed onto a stand with multiple legs having casters therein, where a portion of the casters have locking mechanisms associated therewith and the stand is weighted such that the multiple legs are heavier than the top basket including the wire structure of the basket, the friction lining thereof, and the air supply device therein. Further, the method of operation or using the mobile air supply unit typically includes moving the air supply device into position relative to a patient by grasping a handle atop the air supply device and coupling the air supply device to a patient mattress via a hose before supplying air from the air supply device to the patient mattress.

By having a mobile cart with a weighted base and a top basket with a wire structure, including, for example, wire sides, and an open top configured to receive an air supply device with a top handle that can be easily grasped, the cart and blower can be easily and quickly moved from one location to another without a significant risk of toppling over. Further, by raising the blower up from the floor, the user does not need to bend over to operate the unit and the risk of damage to the unit is reduced. In addition, the mobile cart can have a side basket to hold blankets usable or configured for use with the air blower. As mentioned above, the mobile air blower unit can be used with different mattresses, such as those that permit a patient to be moved from one bed to another, repositioned within a bed, or moved to/from a bed to/from a gurney. Generally, an air supply device or blower is only operable for 15-20 seconds at a time (i.e., the time needed to inflate a mattress), and therefore, such a blower is available for use with numerous different patients or purposes. Therefore, improving the mobility of the cart permits health care providers to more quickly attend to as many patients as possible.

Figure 8:
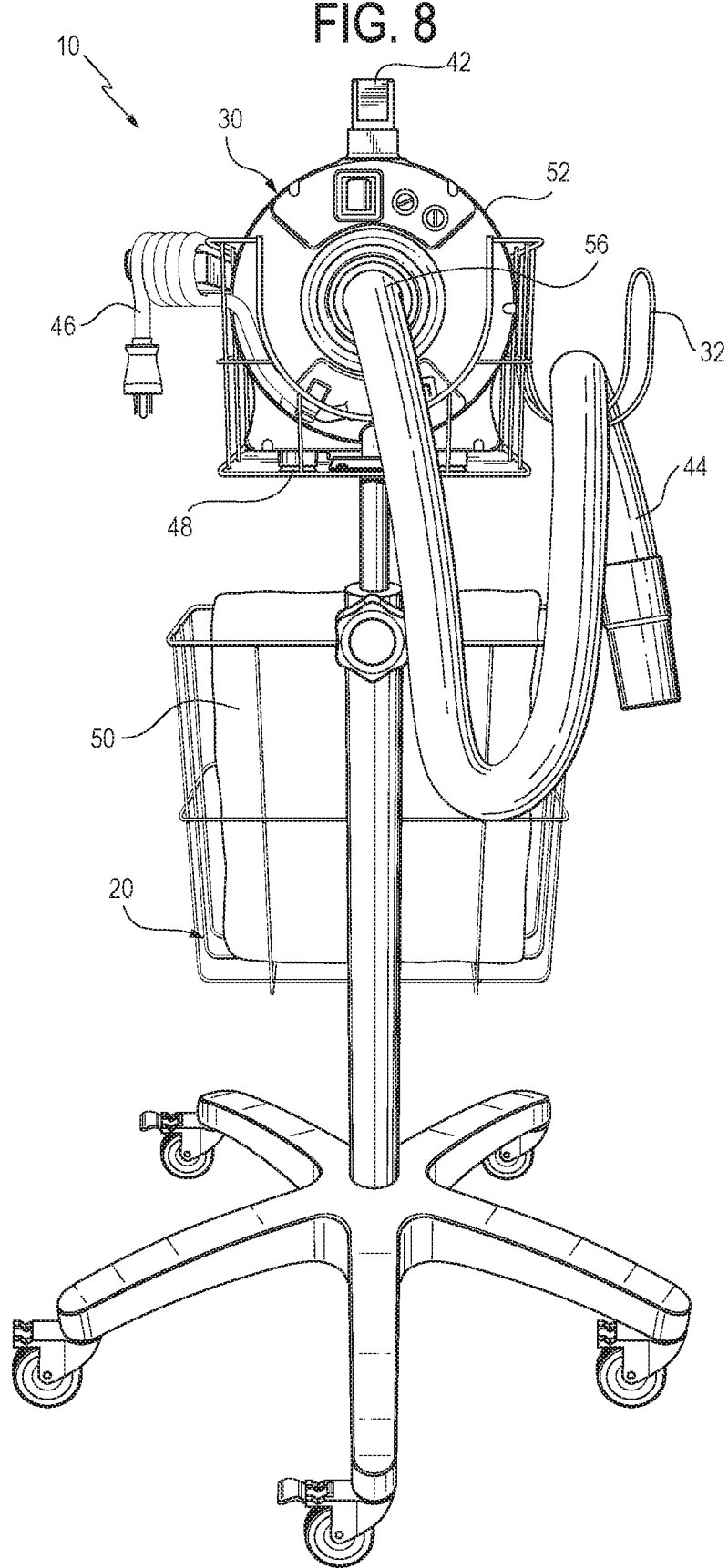
FIG. 8 is a front perspective view showing a mobile air blower unit with a mobile air blower cart and air supply device therewith.

In one illustrative embodiment, shown in FIG. 1, a mobile air blower cart 12 includes a stand 14 with multiple legs 16 having casters 18 with wheels 19 thereon, a retaining hook 32 with openings for a hose 44 (see, FIG. 8) to extend therethrough, and a top basket 28 having a center platform 24 and wire sides 38. As shown in FIG. 8, a mobile air supply kit or blower unit 10 includes the mobile air blower cart with an air blower 30 disposed on the center platform 24 of the top basket. In one illustrative approach, the air supply device or blower 30 has a plurality of friction feet 48 to inhibit relative movement of the blower 30 and the top basket 28 of the blower cart 12 so that the forces applied to the handle are largely transferred to the cart 12. Thus, the weight of the blower 30 and the friction feet 48 sufficiently retains the blower 30 relative to the mobile air blower cart 12.

Figure 3:
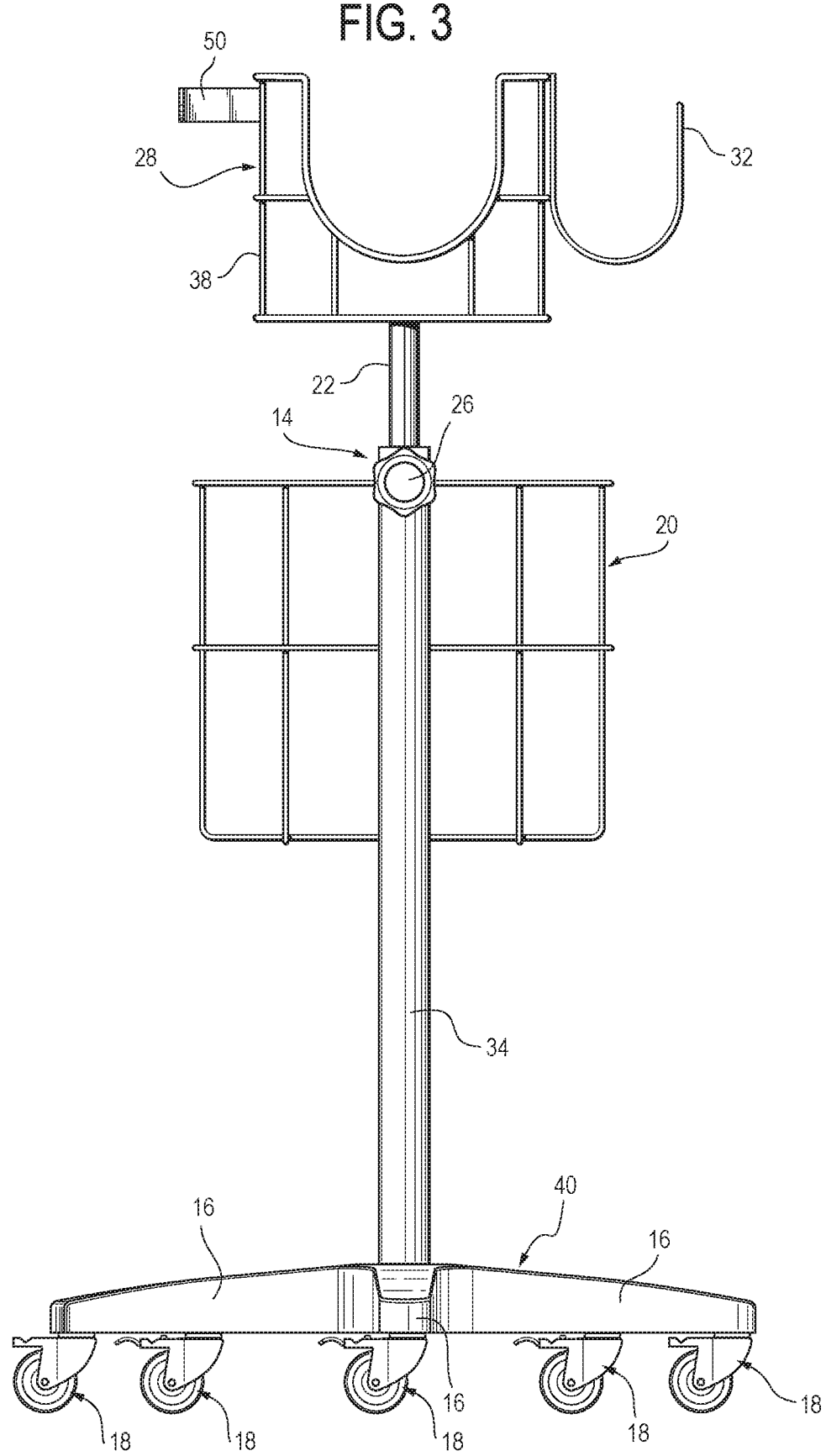
FIG. 3 is a front elevational view thereof.
Figure 4:
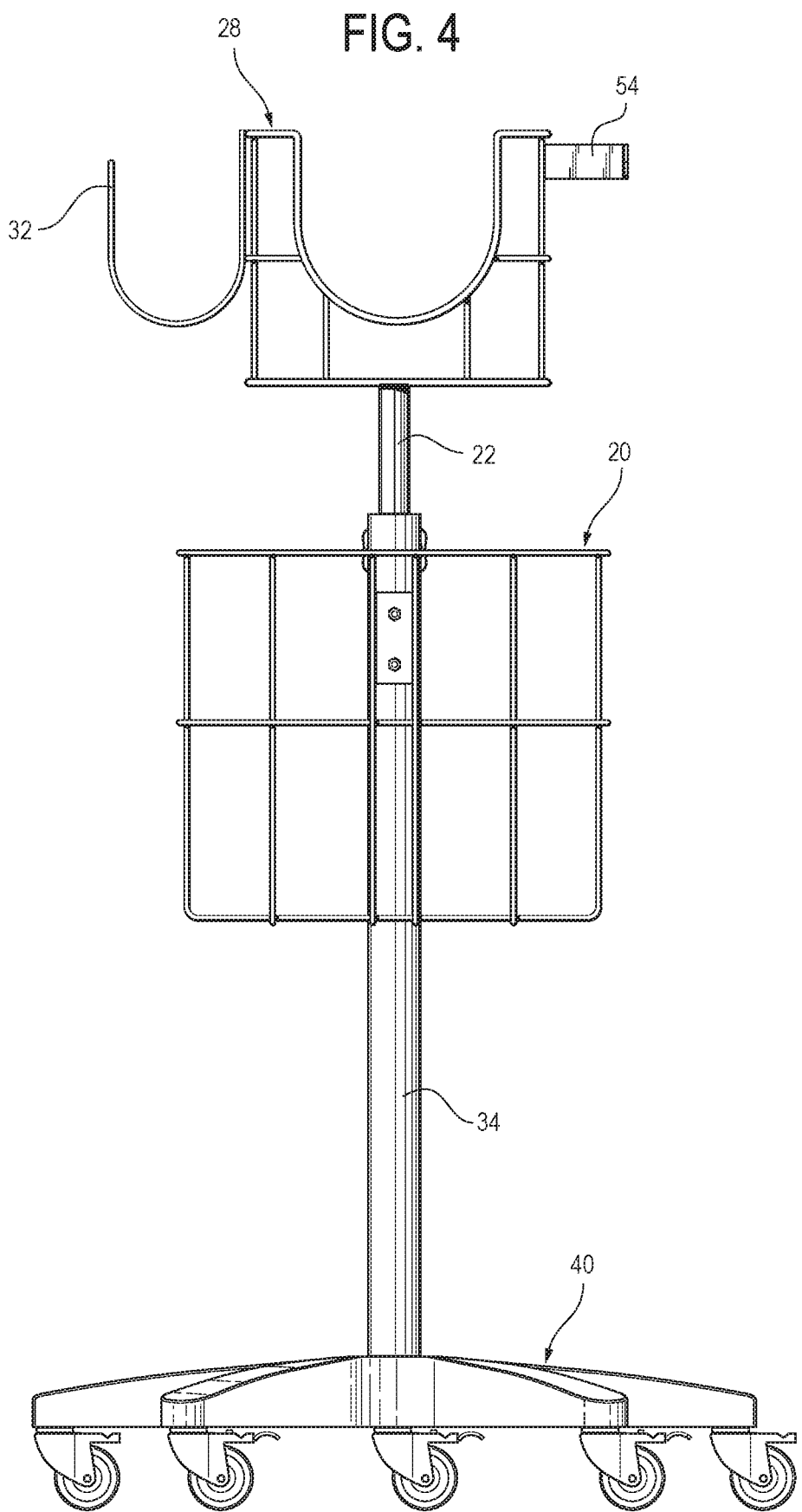
FIG. 4 is a rear elevational view thereof.
Figure 5:
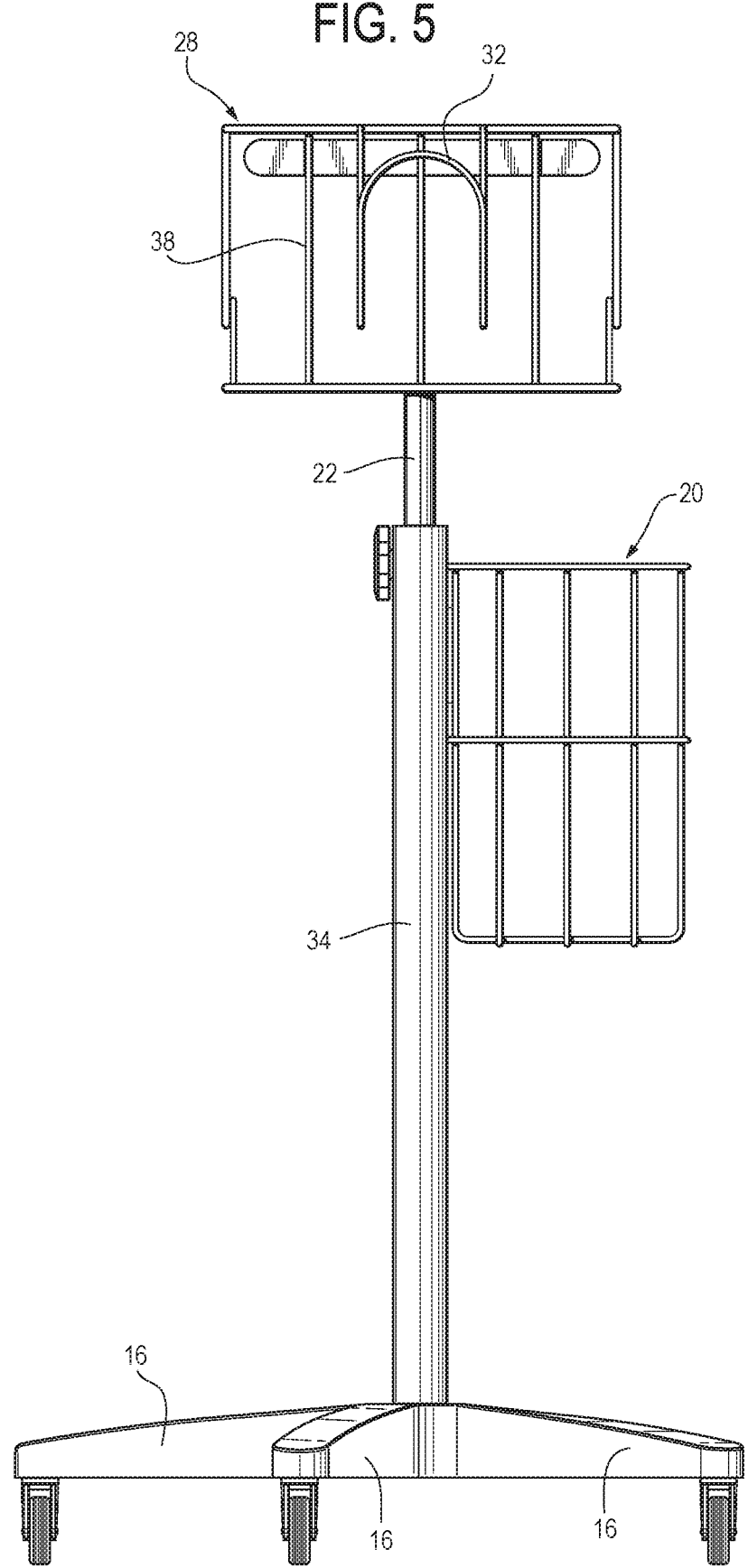
FIG. 5 is a left side elevational view thereof.
Figure 6:
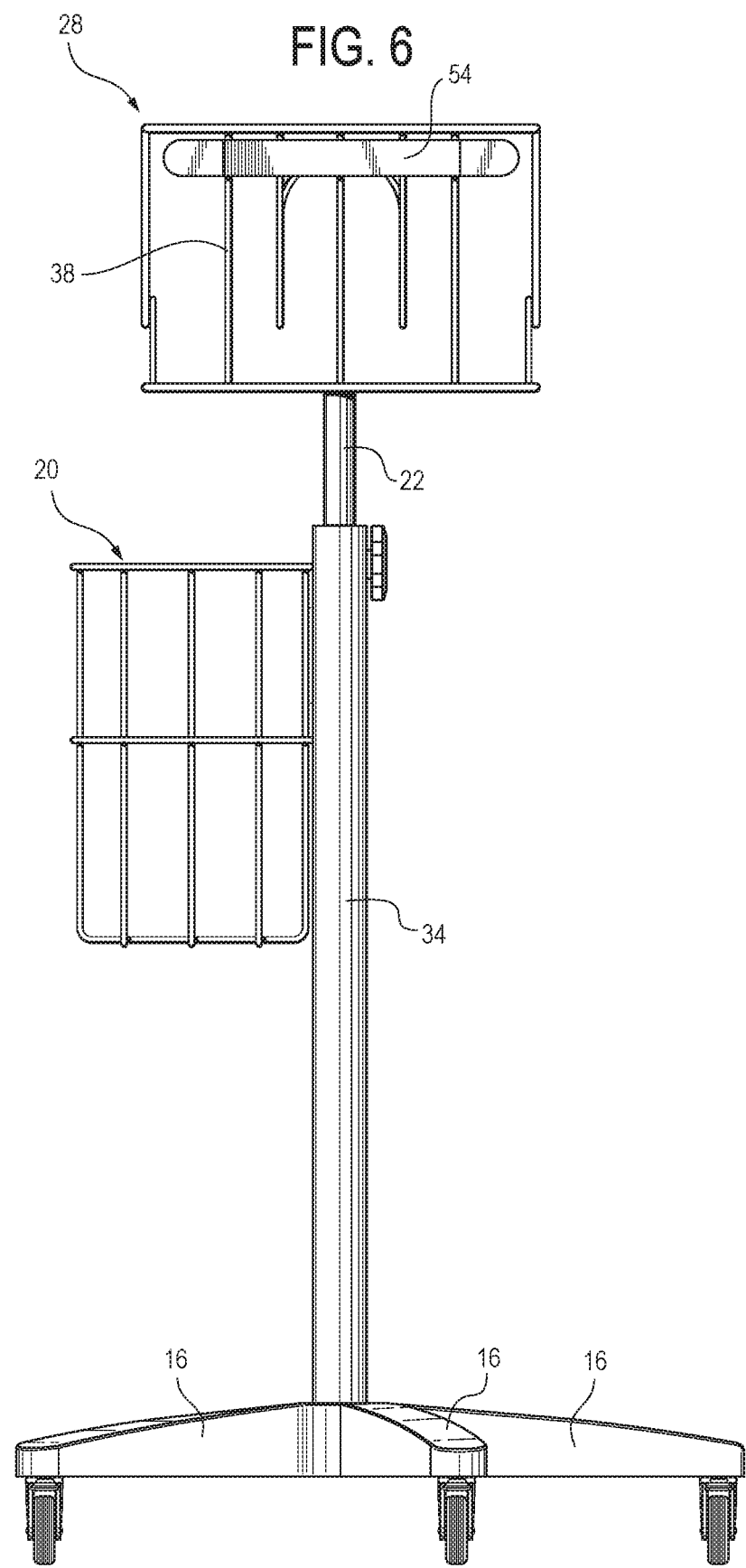
FIG. 6 is a right side elevational view thereof.
Figure 7:
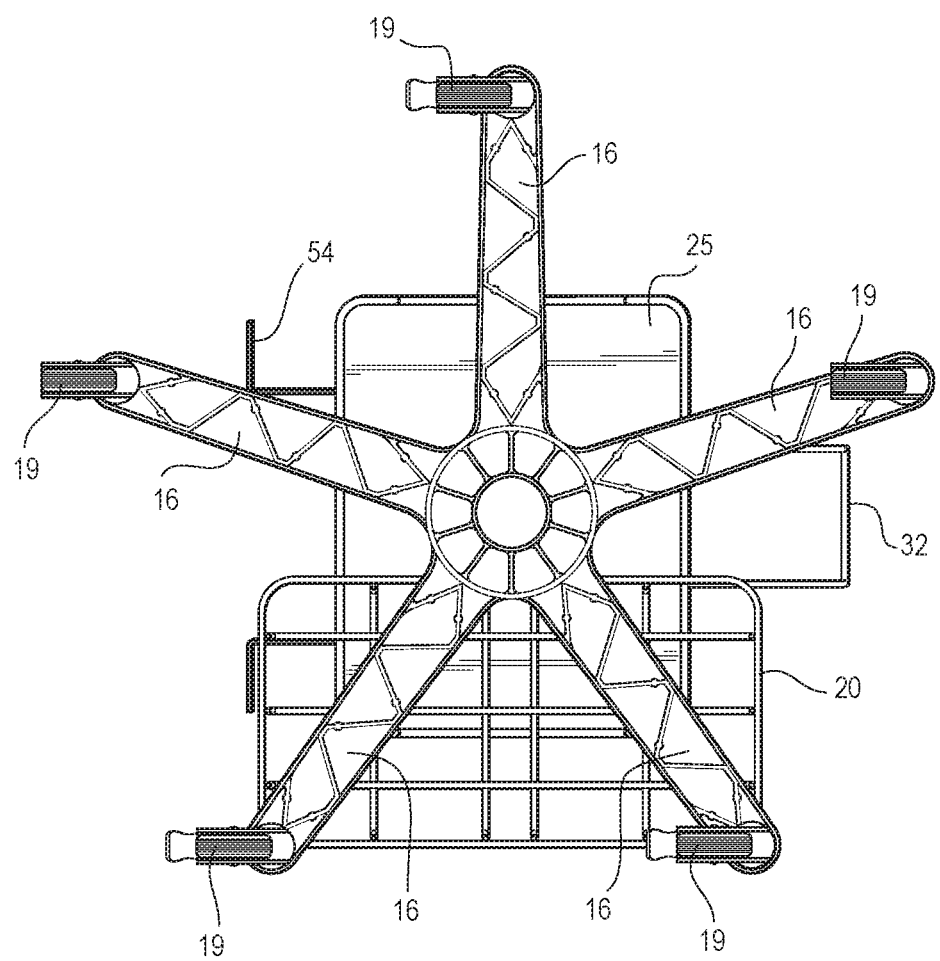
FIG. 7 is a bottom plan view thereof.

As shown in FIG. 3, the stand 14 is comprised, in part, of two telescoping members configured such that the internal pole 22 slides at least partially within the external sleeve 34. Accordingly, the stand 14 is height adjustable such that the top basket 28 and the air supply device or blower 30 supported therein are movable with respect to the stand and therefore the surface upon which the mobile air blower unit is placed. By some approaches, the stand 14 includes a pole knob 26 that secures the telescoping members relative to one another. In this manner, the top basket 28 is secured relative to the base 40 by securing the two telescoping members (i.e., the internal pole 22 and the external sleeve 34) relative to one another.

Further, in some configurations, the stand 14 is biased to a raised configuration such that the top basket 28 is raised and biased to a first, uppermost position and away from a second lowermost position when the telescoping members are not secured relative to one another via the knob 26. In one illustrative example, when the mobile air blower unit 10 is in the first, uppermost position, the handle 42 atop of the air blower 30 is disposed at approximately 49-inches from surface upon which the mobile air blower unit is placed and in the second, lowermost position the handle 42 is disposed approximately 42-inches from the supporting surface. In one illustrative configuration, the mobile air blower cart 12 has an air assisted lift via an air spring such that if the knob 26 is loosened to permit the telescoping members to move relative to one another, the top basket 28 of the mobile air blower cart 12 will raise itself until the knob 26 is tightened or until the limit is reached.

As shown in FIGS. 1 and 8, the stand 14 may have a side basket 20 affixed thereto. The side basket 20 may be employed to retain therapy or transport mattresses 50. The teachings described herein may be employed with a variety of different air mattresses, such as those found in U.S. application Ser. No. 15/449,560, filed Mar. 3, 2017, which is incorporated by reference herein in its entirety.

As illustrated in FIGS. 3-6, the stand 14 is generally substantially vertically oriented during use thereof. Further, one end of the stand 14 engages with a platform 24 of the top basket 28 and another end of the stand 14 includes a base 40 with a plurality of legs 16 with casters 18 associated therewith.

To permit the mobile air blower unit 10 to be easily moved while the handle 42 of the blower is grasped, the lower portion of the unit 10 (i.e., the legs 18 of the stand 14) is generally weighted such that it is heaver than the top basket 28, which includes, for example, wire sides 38, a retaining hook 32, a base or friction lining 25, platform 24, and a cord bracket 54. In operation, the handle 42 atop the blower 30 may be grasped to move the unit 10, and having a weighted base 40 helps prevent the unit 10 from tipping over.

The base 40 also may be sufficiently sized to help prevent tipping of the unit 10, whether when being moved, when locked and in use, and during acceleration thereof. By one approach, the base 40 of the stand 14 formed by the legs 18 has an outer diameter of about twenty to twenty-four inches; in some cases the diameter is about twenty-four inches. Accordingly, the weight and size of the baes 40, as compared to the top basket 28, stabilizes the mobile air blower unit 10 when stationary or in transit.

Figure 2:
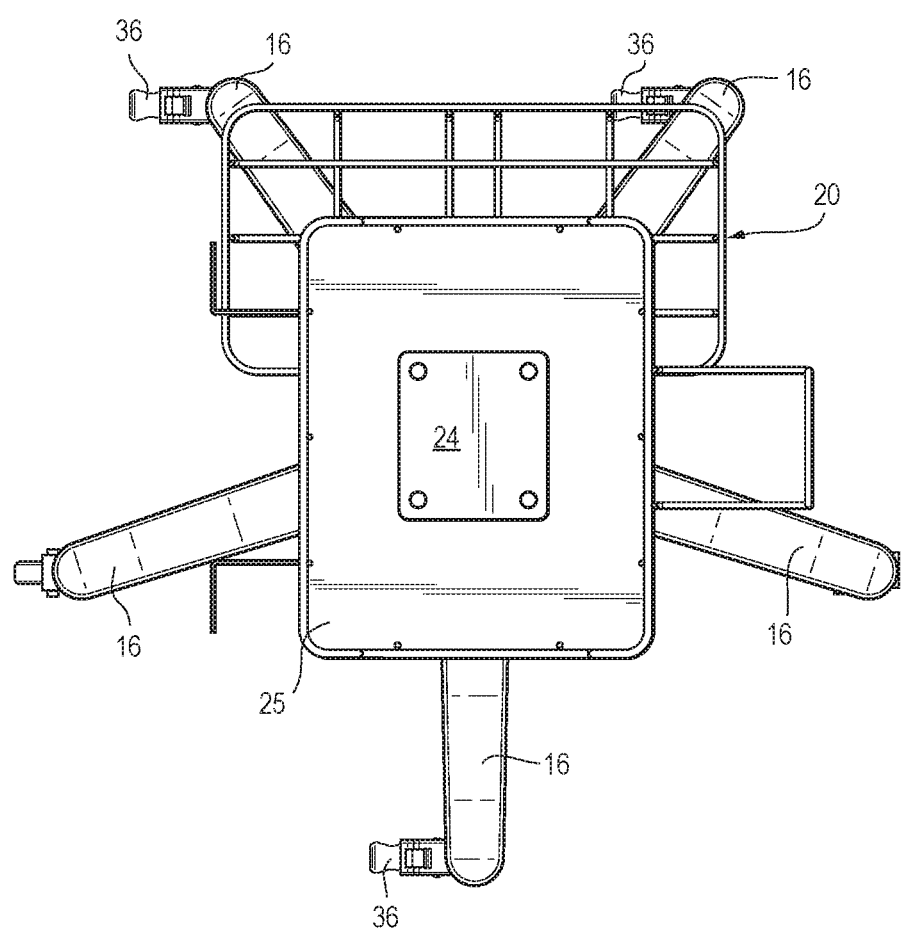
FIG. 2 is a top plan view thereof.

The base 40, as shown in FIG. 1, also may include locking mechanisms 36 on a portion of the casters 18. For example, as shown in FIG. 2, only three of the five legs 16 have locking mechanisms 36 associated therewith. Having locking mechanisms 36 on only a portion of the casters 18 avoids an additional expense by avoiding unnecessary elements. The casters 18 without the locking mechanism 36 may be disposed non-adjacent to one another, i.e., two of the locking mechanisms 36 may be disposed on one side of the cart 12 and the third on the opposite side thereof. Further, in some configurations, the locking mechanisms 36 are operable by foot. In this manner, a user is able to adjust the locking status of the mobile air blower unit 10 while simultaneously grasping the handle 42 atop the blower and then secure the mobile air blower unit 10 into place once moved by adjusting the locking mechanisms 36 by foot, if desired. In addition, the locking mechanisms 36 are generally individually selectable such that only one of the three locking mechanism 36 may be activated at a given time.

In some embodiments, such as that shown in FIG. 2, the top basket 28 includes a center platform 24, a base or friction lining 25 that may be comprised of, for example, a lightweight plastic, silicon, or rubber material, and wire sides 38. Further, the top basket 28 is generally height adjustable, which is particularly helpful since hospital beds and other care locations can be a variety of heights. Because the top basket 28 has a wire frame with wire sides 38, it is relatively light weight as compared to the base 40, which includes the legs 16 and casters 18. As noted above, the base 40 is sufficiently weighted so that the cart 12 is stable at each of the optional heights of the top basket 28.

The top basket 28, via the platform 24, may be secured to the top of the telescoping pole 22 via a plurality of fasteners 60, such as screws, pins, or rivets. Further, the friction lining 25 may be secured into position in the top basket 28 by having a central portion thereof disposed between the center platform 24 and a lower wire structure of the top basket 28. As shown, for example, in FIG. 3, the top basket 28 has wire sides 38 that have an opening on a front portion and a rear portion to permit access to the blower 30 placed therein (see, e.g., FIG. 8). The rear opening of the top basket 28 may accommodate the hose 44 of the air supply device or blower 30. More particularly, as shown in FIG. 8, the blower 30 may be positioned such that the blower outlet 56 is adjacent a front or rear opening portion of the wire sides 38 of the top basket 28.

The air supply device or blower 30 may be of any suitable configuration and may include a number of features that permit it to be easily and quickly mobilized along with the cart 12. For example, as illustrated in FIG. 8, the air supply device or blower 30 has a rounded housing 52 with a handle 42 atop thereof. In use, the handle 42 can be easily grasped by the user. Further, by some approaches, the blower includes a plurality of friction feet 48 that permit the cart 12 to be moved by grasping the handle 42 of the blower (and not necessarily by grasping the cart itself) such that the force used to grasp and move the blower 30 is transferred from the handle 42 to the cart 12, in part, via engagement of the friction feet 48 with the friction lining 25 (even though the housing 52, cord 46, and the blower hose 44 also may be in contact with portions of the cart 12 and also transfer force thereto). In use, the friction feet 48 of the blower 30 may rest on a base or friction lining 25 that is formed, for example, of a lightweight elastomeric material, such as a plastic, silicon, or rubber material. In one illustrative approach, the blower 30 includes a handle atop thereof that may be positioned at between approximately 42-inches to about 49-inches from the surface upon which the unit 10 is placed.

As illustrated in FIG. 8, the blower 30 also may have a cord or plug 46 that may be wound onto a bracket, prongs, or a holder 54 and a hose 44 that is secured at one end to the blower housing 52 and at the other end includes geometry that may be used to couple the blower 30 to, for example, a therapy or transport mattress 50. The blower housing 52 may be configured such that an outlet thereof that connects to the hose 44 is disposed adjacent a side opening of the wire top basket 28.

As noted above, the top handle 42 of the blower 30 may be positioned about 42-inch to about 49-inches from the supporting surface upon which the unit 10 rests. Further, the blower outlet 56 on a rear of the blower may be positioned about four-inches from the top of the handle, such that the blower outlet is about 38-inches to 45-inches from the supporting surface. By one approach, the hose 44 is about five-feet long and has a diameter of about 1.5-inches. To improve the mobility of the cart 12, in some configurations, the hose 44 is generally retained in the retaining hook 32 when not in use.

The air supply device or blower 30 may include a number of different blower features, such as, those found in U.S. application Ser. No. 29/630,376, filed Dec. 20, 2017, and International Application No. PCT/US2017/046257, filed Aug. 10, 2017, which are both incorporated by reference herein in their entirety.

As suggested above, one or more air mattresses 50 may be stored in a side basket 20 secured to the stand 14. This permits the user to easily access the air mattress when moving the patient. The teachings described herein can be employed with a variety of different air mattresses, such as those found in U.S. application Ser. No. 15/449,560, filed Mar. 3, 2017, which is incorporated by reference herein in its entirety.

The mobile air blower units 10 and carts 12 described herein may be employed with a method for mounting an air supply device or blower 30 on a stand with multiple legs having casters thereon, where a portion of the casters have locking mechanisms associated therewith and the stand is weighted such that the multiple legs are heavier than the top basket (even when the air supply device is associated therewith), moving the air supply device into position relative to a patient by grasping a handle atop of the air supply device, coupling the air supply device to a patient mattress, and supplying air from the air supply device to the patient mattress. Accordingly, a user, such as a health care professional, is able to use a single unit 10 to quickly assist a number of patients. Furthermore, the air supply device or blower 30 is retained a distance above the ground to avoid contamination with fluids, dirt, and germs associated with the floor.

All methods described herein can be performed in any suitable order unless otherwise indicated herein or otherwise clearly contradicted by context. The use of any and all examples, or language describing an example (e.g., "such as") provided herein, is intended to illuminate the invention and does not pose a limitation on the scope of the invention. Any statement herein as to the nature or benefits of the invention or of the preferred embodiments is not intended to be limiting. This invention includes all modifications and equivalents of the subject matter recited herein as permitted by applicable law. Moreover, any combination of the above-described elements in all possible variations thereof is encompassed by the invention unless otherwise indicated herein or otherwise clearly contradicted by context. The description herein of any reference or patent, even if identified as "prior," is not intended to constitute a concession that such reference or patent is available as prior art against the present invention. No unclaimed language should be deemed to limit the invention in scope. Any statements or suggestions herein that certain features constitute a component of the claimed invention are not intended to be limiting unless reflected in the appended claims. Neither the marking of the patent number on any product nor the identification of the patent number in connection with any service should be deemed a representation that all embodiments described herein are incorporated into such product or service.

What is claimed is:

1. A mobile air supply kit comprising:
    a stand with multiple legs having casters thereon;
    a top basket having a friction lining; and
    an air supply device disposed at least partially in the top basket, the air supply device having a handle and a plurality of friction feet, the friction feet engaging the friction lining to inhibit relative movement of the air supply device and the top basket when a transverse force is applied to the air supply device by a user manually grasping said handle, the kit permitting rolling translation thereof by manual application of transverse force via said handle.

2. The mobile air supply kit of claim 1 wherein the top basket has a central platform that is smaller than the friction lining, wire sides and an open wire retaining hook and wherein the multiple legs of the stand are collectively heavier than the top basket.

3. The mobile air supply kit of claim 2 wherein the legs of the stand have an outer diameter ranging from about twenty to about twenty-four inches and a portion of the casters have locking mechanisms associated therewith that are operable by foot.

4. The mobile air supply kit of claim 1 wherein the handle of the air supply device is disposed atop thereof.

5. The mobile air supply kit of claim 1 wherein the stand is height adjustable such that the top basket and the air supply supported therein are movable with respect to a base of the stand over a range of travel between a first, uppermost position and a second, lowermost position.

6. The mobile air supply kit of claim 5 wherein the top basket is biased to the first, uppermost position.

7. The mobile air supply kit of claim 6 wherein the stand comprises telescoping members and a pole knob that secures the telescoping members relative to one another and the top basket relative to the legs of the stand.

8. The mobile air supply kit of claim 5 wherein the first, uppermost position places the handle of the air supply device atop thereof at a height ranging from 45-55 inches from a surface upon which the mobile air supply kit unit is placed.

9. The mobile air supply kit of claim 1 wherein the air supply device has at least four friction feet.

10. The mobile air supply kit of claim 1 having five legs, each with a caster thereon, wherein only three of the five casters having locking mechanisms associated therewith.

11. The mobile air supply kit of claim 1 further comprising a side basket comprised of wire, the side basket sized for retaining therapy air mattresses.

* * * * *